(12) United States Patent
Cowan et al.

(10) Patent No.: US 8,578,493 B1
(45) Date of Patent: Nov. 5, 2013

(54) BOTNET BEACON DETECTION

(75) Inventors: Joe Cowan, Palo Alto, CA (US); Robert Edward Esposito, Gilroy, CA (US); Travis Edward Dawson, San Francisco, CA (US); Supranamaya Ranjan, Albany, CA (US)

(73) Assignee: Narus, Inc., Sunnyvale, CA (US)

( * ) Notice: Subject to any disclaimer, the term of this patent is extended or adjusted under 35 U.S.C. 154(b) by 420 days.

(21) Appl. No.: 13/104,804

(22) Filed: May 10, 2011

(51) Int. Cl.
*G06F 12/14* (2006.01)
(52) U.S. Cl.
USPC .................. 726/23; 726/22; 726/25; 709/224
(58) Field of Classification Search
USPC .................................. 726/22, 23, 25; 709/224
See application file for complete search history.

(56) References Cited

U.S. PATENT DOCUMENTS

| | | | | |
|---|---|---|---|---|
| 7,313,821 B1* | 12/2007 | Steiner et al. | .................. | 726/23 |
| 7,451,488 B2* | 11/2008 | Cooper et al. | .................. | 726/25 |
| 7,483,972 B2* | 1/2009 | Bhattacharya et al. | ....... | 709/224 |
| 7,823,202 B1* | 10/2010 | Nucci et al. | ..................... | 726/22 |
| 8,180,892 B2* | 5/2012 | Deridder et al. | .............. | 709/224 |
| 8,260,914 B1* | 9/2012 | Ranjan | ............................. | 726/23 |
| 8,402,543 B1* | 3/2013 | Ranjan et al. | .................. | 726/23 |
| 8,418,249 B1* | 4/2013 | Nucci et al. | ..................... | 726/23 |
| 2003/0084349 A1* | 5/2003 | Friedrichs et al. | ............ | 713/201 |
| 2010/0161795 A1* | 6/2010 | Deridder et al. | .............. | 709/224 |
| 2010/0257580 A1* | 10/2010 | Zhao | ................................ | 726/1 |
| 2011/0296007 A1* | 12/2011 | Liu et al. | ....................... | 709/224 |

\* cited by examiner

*Primary Examiner* — Amare F Tabor
(74) *Attorney, Agent, or Firm* — Fernandez & Associates, LLP

(57) ABSTRACT

A method and system to detect botnet beaconing event based on a beacon detection rule set to generate a beacon alert, which is in turn used to trigger an elevated exfiltration detection activity by reducing various thresholds in an exfiltration detection rule set.

30 Claims, 6 Drawing Sheets

BOTNET BEACON DETECTION

CROSS REFERENCE TO RELATED APPLICATIONS

Background of the Invention

1. Field of the Invention

The present invention relates to computers and computer networks. More particularly, the invention relates to detecting malicious activities in the computer network.

2. Background of the Related Art

The term "botnet" refers to a collection of malicious software agents that run autonomously and automatically. The term "botnet" can also be used to refer to a collection of compromised computers (referred to as bots) each infected with one or more of such malicious software agents. For example, the infection may be a result of installation via drive-by downloads exploiting web browser vulnerabilities, worms, Trojan horses, or backdoors, under a common command-and-control infrastructure. Typically, the owner (i.e., originator, operator, or controller) of a botnet uses the botnet to coordinate spam campaigns, launch denial-of-service attacks, or steal sensitive information (e.g., exfiltration). In particular, exfiltration refers to the unauthorized release of data from within a computer system (e.g., an enterprise network). This includes copying the data out through covert network channels or the copying of data to unauthorized media.

A botnet's originator can control the bots remotely, usually through a means such as IRC (Internet Relay Chat), from a command-and-control (C&C) server. Though rare, more experienced botnet operators program their own commanding protocols from scratch. For example, these protocols may include a server program for C&C and a client program for operation that embeds itself on the victim's machine (i.e., bot). Both programs usually communicate with each other over a network using a unique encryption scheme for stealth and protection against detection or intrusion into the botnet network.

Generally, detection of C&C channels is difficult for many reasons, including: 1) the use of HTTP protocols to bypass firewalls, 2) encryption to obscure payloads, and 3) "domain fast-flux," i.e., constantly changing locations of command-and-control servers. Existing approaches that look for payload signatures can be easily defeated by encryption or obfuscation techniques.

SUMMARY

In general, in one aspect, the invention relates to a method for identifying a botnet in a network. The method includes obtaining a first plurality of flows each having a flow size less than a first pre-determined threshold and comprising a tuple of <source Internet Protocol (IP) address, destination IP address, server port, protocol>, comparing, by a hardware processor, the destination IP address and each IP address in a well known IP list to determine that the destination IP address is not included in the well known IP list, analyzing, by the hardware processor, a plurality of timestamps of the first plurality of flows to determine an average period and a variance of the average period, generating an alert in response to the average period being within a pre-determined range and the variance being less than a second pre-determined threshold, repetitively obtaining a plurality of network traffic data sets each obtained at one of a plurality of recurring time points, wherein each network traffic data set comprises a second plurality of flows each having a flow size exceeding a third pre-determined threshold and comprising a particular <source IP address, destination IP address> pair, analyzing each of the plurality of network traffic data sets based on a pre-determined exfiltration rule set to generate an exfiltration detection result at each of the plurality of recurring time points, wherein the pre-determined exfiltration rule set comprises a plurality of thresholds, modifying, in response to at least one element of the particular <source IP address, destination IP address> pair matching the alert, the pre-determined exfiltration rule set to generate a modified exfiltration rule set by reducing at least one threshold of the plurality of thresholds, and detecting an exfiltration event based on the modified exfiltration rule set.

In general, in one aspect, the invention relates to a system for identifying a botnet in a network. The system includes (i) a hardware processor, (ii) an acquisition module executing on the hardware processor and configured to obtain a first plurality of flows each having a flow size less than a first pre-determined threshold and comprising a tuple of <source Internet Protocol (IP) address, destination IP address, server port, protocol> and repetitively obtain a plurality of network traffic data sets each obtained at one of a plurality of recurring time points, wherein each network traffic data set comprises a second plurality of flows each having a flow size exceeding a third pre-determined threshold and comprising a particular <source IP address, destination IP address> pair, (iii) a beacon detector coupled to the acquisition module, executing on the hardware processor, and configured to compare the destination IP address and each IP address in a well known IP list to determine that the destination IP address is not included in the well known IP list, analyze a plurality of timestamps of the first plurality of flows to determine an average period and a variance of the average period, and generate an alert in response to the average period being within a pre-determined range and the variance being less than a second pre-determined threshold, and (iv) an exfiltration detector, executing on the hardware processor, coupled to the beacon detector, and configured to analyze each of the plurality of network traffic data sets based on a pre-determined exfiltration rule set to generate an exfiltration detection result at each of the plurality of recurring time points, wherein the pre-determined exfiltration rule set comprises a plurality of thresholds, modify, in response to at least one element of the particular <source IP address, destination IP address> pair matching the alert, the pre-determined exfiltration rule set to generate a modified exfiltration rule set by reducing at least one threshold of the plurality of thresholds, and detect an exfiltration event based on the modified exfiltration rule set.

In general, in one aspect, the invention relates to a non-transitory computer readable medium storing instructions for identifying a botnet in a network. The instructions when executed by a processor of a computer includes functionality for obtaining a first plurality of flows each having a flow size less than a first pre-determined threshold and comprising a tuple of <source Internet Protocol (IP) address, destination IP address, server port, protocol>, comparing the destination IP address and each IP address in a well known IP list to determine that the destination IP address is not included in the well known IP list, analyzing a plurality of timestamps of the first plurality of flows to determine an average period and a variance of the average period, generating an alert in response to the average period being within a pre-determined range and the variance being less than a second pre-determined threshold, repetitively obtaining a plurality of network traffic data sets each obtained at one of a plurality of recurring time points, wherein each network traffic data set comprises a second plurality of flows each having a flow size exceeding a third pre-determined threshold and comprising a particular <source IP address, destination IP address> pair, analyzing each of the plurality of network traffic data sets based on a pre-determined exfiltration rule set to generate an exfiltration detection result at each of the plurality of recurring time points, wherein the pre-determined exfiltration rule set comprises a plurality of thresholds, modifying, in response to at least one element of the particular <source IP address, destination IP address> pair matching the alert, the pre-determined exfiltration rule set to generate a modified exfiltration rule set by reducing at least one threshold of the plurality of thresholds, and detecting an exfiltration event based on the modified exfiltration rule set.

Other aspects and advantages of the invention will be apparent from the following description and the appended claims.

DETAILED DESCRIPTION

Figure 1:
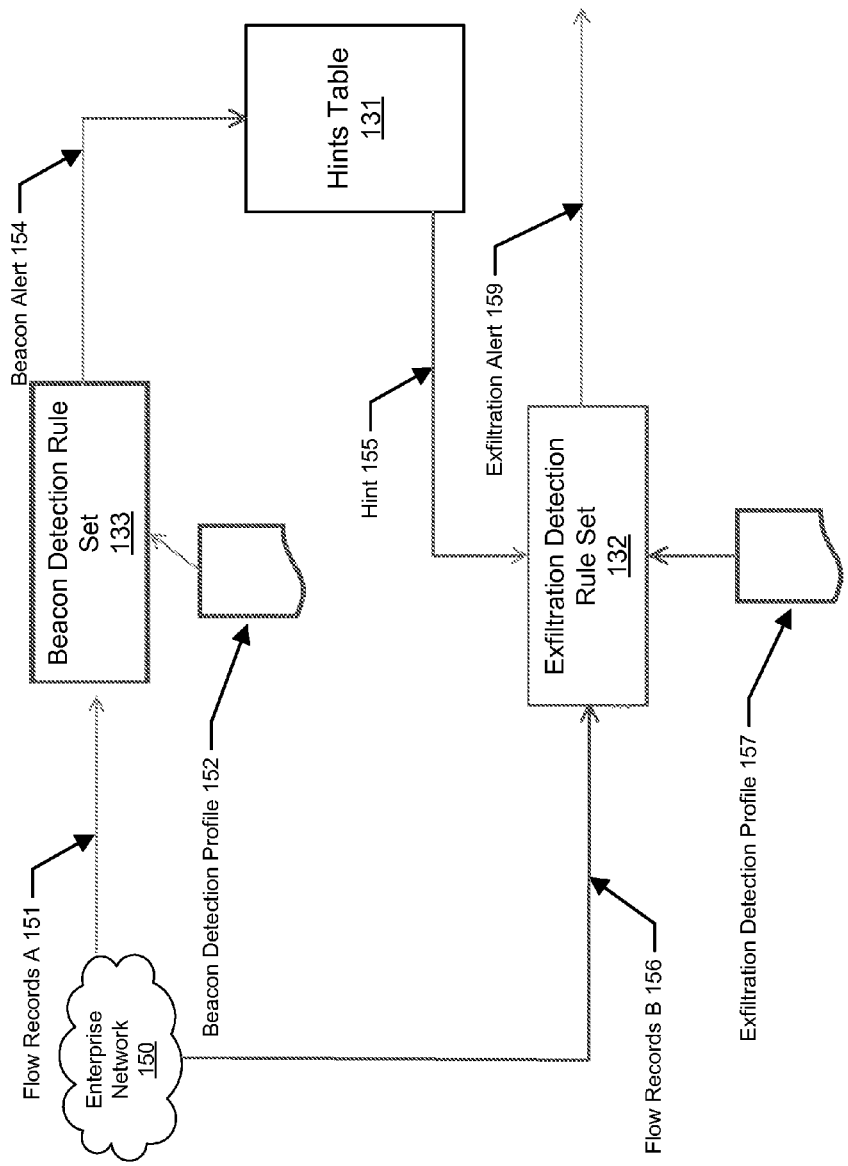
FIG. 1 shows a system architecture diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Beaconing is defined as sending a packet or packets to an external host at substantially regular periods in order to inform an external host that the client is still "alive and functioning properly". This is used in botnets in order to allow infected machines to inform their controllers that they are able to accept orders or that they have data to exfiltrate from their infected hosts. These beaconing events are often communication channels or signals that originate from infected computers (i.e., bots) inside an enterprise network. These bots attempt to alert/notify C&C servers outside the enterprise network of their existence and status of remote control operation for malicious use. Throughout this disclosure, the terms "internal", "inside", "external", and "outside" are used with respect to the enterprise network or other pre-determined portion of a computer network.

Embodiments of the invention provide a method and system to detect botnet beaconing event based on a beacon detection rule set to generate a beacon alert, which is in turn used to trigger an elevated exfiltration detection activity by reducing (i.e., tightening) various thresholds in an exfiltration detection rule set. FIG. 1 shows a system architecture diagram according to aspects of the invention. As shown in FIG. 1, flow records A (151) in IP (Internet Protocol) traffic exiting an enterprise network (150) are monitored based on the beacon detection rule set (133) to identify hosts (not shown) within the enterprise network (150) that are beaconing at substantially regular intervals to external IPs (not shown) that are not in a pre-determined list of "well known and likely to be benign" IPs. Throughout this disclosure, such list of "well known and likely to be benign" IPs is referred to as the "well known IP list". A well known IP is an IP that is common, i.e., connected to by a high percentage of other hosts. Conversely, an IP is not well known if it is uncommon, i.e., connected to by only a very low percentage of other hosts. More details of the well known IP list are described in reference to FIG. 2 below.

In one or more embodiments of the invention, the rules in the beacon detection rule set (133) are configurable using parameters in the beacon detection profile (152). Specifically, to detect these beaconing events in network traffic, a number of tuning thresholds in the beacon detection profile (152) are used for configuring/adjusting the beacon detection rule set (133) to filter or eliminate non-beacon-like events based on metrics such as packet size, flow size, duration of beaconing interval (i.e., duration between beacon-like events), variance of beaconing interval over time, etc. For example, flows with very few packets and small packet sizes in the flow records A (151) are more likely to be beacons. Accordingly, when these types of flows are repeated over a given period of time (e.g., repeated once every hour), they may be labeled as beacons to generate the beacon alert (154) and stored as entries in the hints table (131). Each entry in the hints table (131) includes the source IP address and other attributes of a detected beacon and may be used as a hint (e.g. hint (155)) to configured the exfiltration rule set (132). More details of the hints table (131) are described in reference to FIG. 2 below.

In particular, analyzing an individual flow's metrics (e.g., packet size, number of packets, packet protocol, and how often similar flows repeat) allow for highly accurate beacon detection with no inspection of payload data beyond Layer 4. This allows for a greater range of detection beyond known botnet patterns. Further, the level of false positives in generating beacon alert (154) may be adjusted (e.g., improved) based on the flow size thresholds in the beacon detection profile (152). For example, the detection accuracy of the beacon detection rule set (133) may be improved by focusing on flows that consist of smaller then average size (e.g., flows with fewer packets/bytes then a pre-determined percentage of all flows).

In one or more embodiments of the invention, hints (e.g. hint (155)) are used to enhance (i.e., improve or increase) the detection of exfiltration events. Specifically, any IP in the enterprise network (150) that exhibits questionable behavior is tracked in the hints table (131) based on a detected beacon (e.g., in beacon alert (154)) associated with the IP. Accordingly, network traffic associated with such IP is analyzed using elevated exfiltration detection scheme. In one or more embodiments, the rules in the exfiltration rule set (132) are configurable using parameters in the exfiltration detection profile (157). For example, when flow records B (156) exiting the enterprise network (150) are detected as being associated with an IP tracked in the hints table (131) (e.g., via hint (155)), the exfiltration detection profile (157) is switched to using more stringent thresholds and baselines to adjust the exfiltration rule set (132) for analyzing the flow records B (156) to detect exfiltration event and generating the exfiltration alert (159) more expediently. In particular, an internal IP address associated with a beacon alert (e.g., in beacon alert (154)) and tracked in a hints table entry (e.g., hint (155)) are closely monitored when communicating to the same external IP address that generated the beacon alert. For example, binaries, attachments or any substantial data flow are analyzed in detail. More details of the exfiltration rule set (132) and exfiltration detection profile (157) are described in reference to FIG. 2 below.

In one or more embodiments, the exfiltration detection profile (157) includes (i) an exfiltration flow size threshold used for determining a large flow coming out of a host, (ii) other thresholds of network traffic parameters (e.g., average data transfer rate threshold, peak data transfer rate threshold, open connections threshold, active protocols threshold, open ports threshold, etc.), and (iii) a configurable multiplier for the last known rate referred to as the last known rate multiplier. Accordingly, the exfiltration detection profile (157) is switched to using more stringent thresholds and multiplier by (i) reducing the exfiltration flow size threshold and other network traffic thresholds to increase sensitivities to changes in network traffic (e.g., flow records B (156)), (ii) activating connection analysis to inspect each new connection and protocol with more detail, and (iii) comparing the current data rate to the last known rate based on the last known rate multiplier. For example, if a new data connection is made between the same client (i.e., source IP address) and server (i.e., destination IP address) in the generated beacon alert (154) as tracked in the hints table (131), then the connection analysis is activated to inspect all packets of the new data connection for binaries, attachments, or substantial data uploads.

Figure 2:
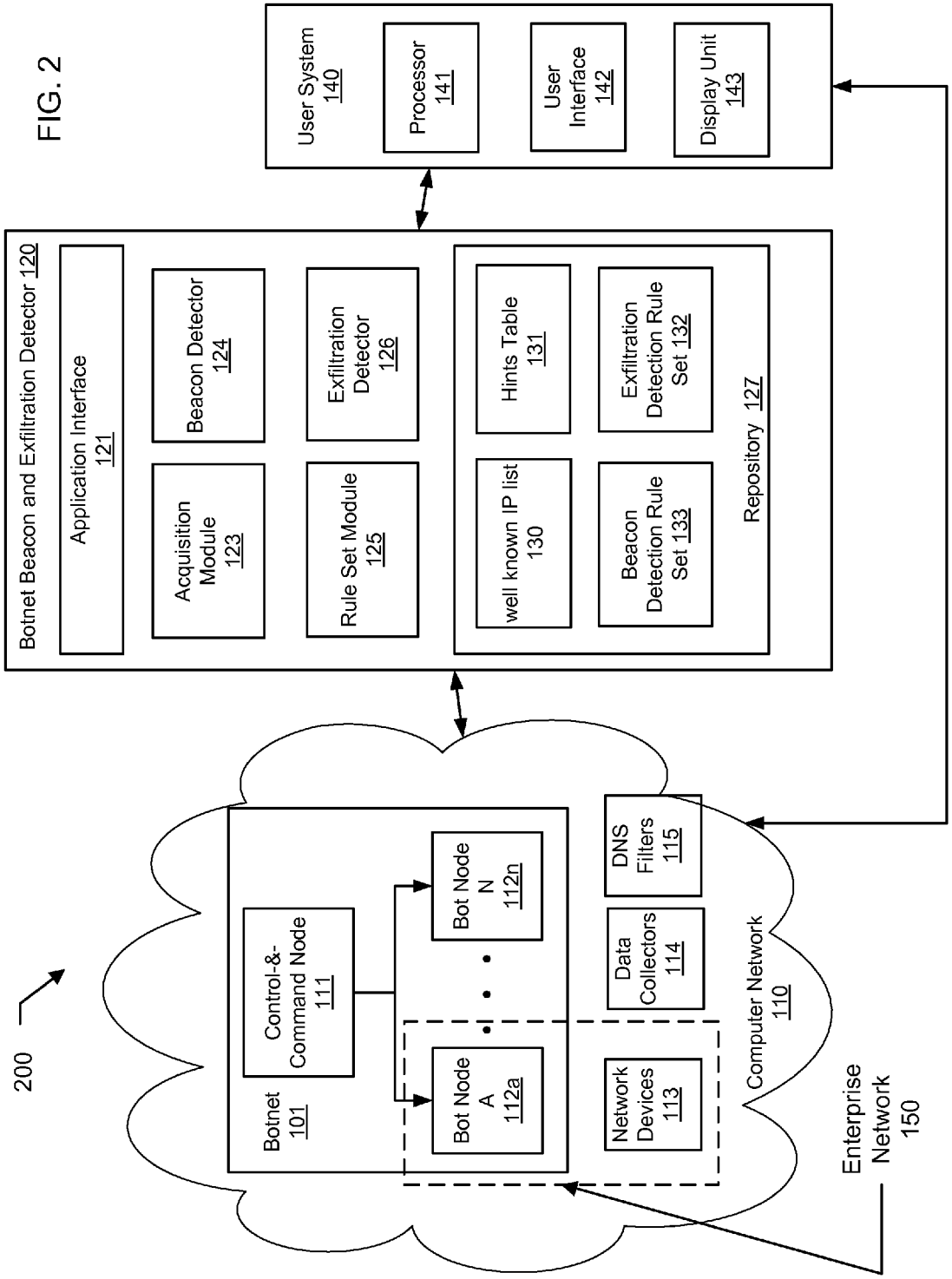
FIG. 2 shows a system block diagram according to aspects of the invention.

FIG. 2 shows a diagram of a system (200) for botnet beacon detection and exfiltration detection in accordance with one or more embodiments. The system (200) includes a botnet beacon and exfiltration detector (120), a user system (140), and a computer network (110). The botnet beacon and exfiltration detector (120) includes storage repository (127), one or more application interfaces (121), acquisition module (123), beacon detector (124), rule set module (125), and exfiltration detector (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, a portion of the computer network (110) may be infected by malicious programs to form a botnet (101) including a control-and-command (C&C) node (111) and one or more bot nodes (e.g., bot node A (112a), bot node N (112n), etc.). Generally, the botnet (101) may cause additional malicious activities to affect and/or infect other network devices (e.g., network devices (113)) within the computer network (110). In one or more embodiments, certain device(s) (e.g., data collectors (114)) within the computer network (110) may be configured to collect network data (not shown) for providing to the botnet beacon and exfiltration detector (120). In one or more embodiments, certain device(s) (e.g., DNS filters (115)) within the computer network (110) may be configured to sanction (e.g., passing or blocking) network traffic (e.g., DNS queries, not shown) based on information from the botnet beacon and exfiltration detector (120). The C&C node (111), bot node A (112a), bot node N (112n), and network devices (113) are generally referred to as nodes of the computer network (110). The enterprise network (150) shown in FIG. 1 above is shown as a portion of the computer network (110) in FIG. 2 in more detail. As shown in FIG. 2, the enterprise network (150) includes the network devices (113) and bot node A (112a), among other nodes (not shown). Each of these components is described below. One of ordinary skill in the art will appreciate that embodiments are not limited to the configuration shown in FIG. 2.

In one or more embodiments of the invention, the botnet beacon and exfiltration detector (120) is configured to interact with the computer network (110) using one or more of the application interface(s) (121). The application interface (121) may be configured to receive data (e.g., network traffic data, not shown) from the computer network (110) and/or store received data to the storage repository (127). Such network data captured over a time period (e.g., a minute, an hour, a day, a week, etc.) is referred to as flow records or network trace. A flow record or network trace contains data units (e.g., IP addresses, flow tuples, domain names, etc.) related to communications between nodes in the computer network (110). The data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the botnet beacon and exfiltration detector (120).

In one or more embodiments, the application interface (121) may be configured to provide data (e.g., alert or other results) and/or instruction (e.g., to initiate a network security operation) from the botnet beacon and exfiltration detector (120) to the computer network (110). For example, an alert identifying detected malicious node names or an instruction to block malicious traffic may be provided via the application interface (121) to the DNS filters (115). For example, the DNS filters (115) may include a DNS server configured to block certain domain names by specifying the blocked domain names in the DNS server policy, i.e., domain blacklisting. Further, the DNS filters (115) may include a network router that intercept and selectively block DNS traffic (e.g., DNS queries and/or replies) passing over the computer network (110) or a portion thereof. In particular, the identified malicious node name may be used to facilitate the identification of a source node in the computer network (110) that sends one or more DNS queries of such malicious domain names. For example, once a malicious domain name is determined, the DNS flows/packets may be reviewed to determine which client in the network initiated the relevant DNS query: (1) the querier may be a DNS resolver acting on behalf of the actual client (i.e., source node) or (2) it may be the actual client (i.e., source node) which sent the query directly to the DNS server. In case (1) above, the logs maintained at the particular DNS resolver may be reviewed to find out the IP address of the client (i.e., source node) which actually contacted this resolver and be identified as a bot.

Accordingly, one or more network router(s) located logically between the DNS server and the source node (e.g., a bot) sending the malicious DNS queries may be configured to act as the DNS filters (115) blocking such bot-generated DNS queries. In one or more embodiments, the DNS filters (115) may be configured in the computer network (110) by a network communication service provider (e.g., ISP), a network security service provider, or other business or government entities. In one or more embodiments, the botnet beacon and exfiltration detector (120) is configured to support various data formats provided by the computer network (110).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the botnet beacon and exfiltration detector (120). The user may include, but is not limited to, an individual, a group, an organization, or some other entity having authority and/or responsibility to access the botnet beacon and exfiltration detector (120). Specifically, the context of the term "user" here is distinct from that of a user of the computer network (110). The user system (140) may be, or may contain a form of, an internet-based communication device that is capable of communicating with the application interface (121) of the botnet beacon and exfiltration detector (120). Alternatively, the botnet beacon and exfiltration detector (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the botnet beacon and exfiltration detector (120) (e.g., report, alert, etc.).

As shown, communication links are provided between the botnet beacon and exfiltration detector (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the botnet beacon and exfiltration detector (120), the user system (140), and the communication links may be part of the computer network (110).

In one or more embodiments, a central processing unit (CPU, not shown) of the botnet beacon and exfiltration detector (120) is configured to execute instructions to operate the components of the botnet beacon and exfiltration detector (120) (e.g., storage repository (127), the application interface (121), the acquisition module (123), and the exfiltration detector (126)). In one or more embodiments, the memory (not shown) of the botnet beacon and exfiltration detector (120) is configured to store software instructions for analyzing the network trace to detect beacon events and exfiltration events. The memory may be one of a variety of memory devices, including but not limited to random access memory (RAM), read-only memory (ROM), cache memory, and flash memory. The memory may be further configured to serve as back-up storage for information stored in the storage repository (127).

In one or more embodiments, the botnet beacon and exfiltration detector (120) is configured to obtain and store data in the storage repository (127). In one or more embodiments, the storage repository (127) is a persistent storage device (or set of devices) and is configured to receive data from the computer network (110) using the application interface (121). The storage repository (127) is also configured to deliver working data to, and receive working data from, the acquisition module (123), beacon detector (124), rule set module (125), and exfiltration detector (126). The storage repository (127) may be a data store (e.g., a database, a file system, one or more data structures configured in a memory, some other medium for storing data, or any suitable combination thereof), which may include information (e.g., well known IP list (130), hints table (131), beacon detection rule set (133), exfiltration detection rule set (132), etc.) related to the botnet beacon and exfiltration detection. The storage repository (127) may be a device internal to the botnet beacon and exfiltration detector (120). Alternatively, the storage repository (127) may be an external storage device operatively connected to the botnet beacon and exfiltration detector (120).

In one or more embodiments, the botnet beacon and exfiltration detector (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the botnet beacon and exfiltration detector (120) is configured to support various data formats provided by the user system (140).

In one or more embodiments, the botnet beacon and exfiltration detector (120) includes the acquisition module (123) that is configured to obtain network trace from the computer network (110), for example via data collectors (114). In one or more embodiments, the acquisition module (123) works in conjunction with the data collectors (114) to parse data packets and collate data packets belonging to the same flow tuple (e.g., defined by a source IP address, destination IP address, etc.).

In one or more embodiments, the acquisition module (123) includes software instructions executing on the aforementioned CPU and is configured to obtain flow records A (151) of FIG. 1 for beacon detection. Specifically, flows exiting the enterprise network (150), each having a flow size less than a pre-determined beacon flow size threshold and including a particular tuple of <source IP address, destination IP address, port, protocol> are collected to form flow records A (151) identified by the particular <source IP address, destination IP address, port, protocol> tuple. For example, the flow size may be a measure of packet size, a measure of packet counts, a measure of bytes sent, or other applicable size measure of the flow record. Further, a flow size measure may represents how often a similar packet repeats it self in the flow record. In one or more embodiments, the flow records A (151) may be obtained continuously, on periodic basis (e.g., hourly, daily, weekly, etc.), or based on an event or manual trigger.

In one or more embodiments, the botnet beacon and exfiltration detector (120) includes the beacon detector (124) that includes software instructions executing on the aforementioned CPU and is configured to detect botnet-like beaconing event using one or more rules in the beacon detection rule set (133). As noted above, the rules in the beacon detection rule set (133) are configurable using parameters in the beacon detection profile (152).

In one or more embodiments, the beacon detector (124) is configured to determine whether flow records A (151) is destined to a well known IP with certain regularity. Specifically, the beacon detector (124) determines whether the destination IP address of the tuple identifying the flow records A (151) is a well known IP by comparing it with each IP address in a well known IP list. For example, the destination IP address may be identified as not a well known IP if it is determined that the destination IP address of the tuple is not included in the well known IP list. In addition, the beacon detector (124) analyzes timestamps of the flows in the flow records A (151) to determine an average period and a variance of the average period over time. For example, the timestamps may be irregular indicating random timing of flows. Alternatively, some of the timestamps may exhibit substantially regular occurrences. Accordingly, an alert (e.g., beacon alert (154)) is generated in response to the average period of such substantially regular occurrences being within a pre-determined beacon timing interval range (e.g., 1 minute, 1 hour, 1 day, etc.) and the variance of such substantially regular occurrences being less than a pre-determined beacon timing variance threshold (e.g., 1%, 5%, etc.).

In one or more embodiments, the alert (e.g., beacon alert (154)) includes an indication that the source IP address of the tuple is associated with a potential bot of the botnet. In one or more embodiments, the alert (e.g., beacon alert (154)) includes an indication that the destination IP address of the tuple is associated with a potential C&C server of the botnet. In one or more embodiments, the alert (e.g., beacon alert (154)) includes the tuple, the average period, the variance, and/or other parameters of the flow records (e.g., flow records A (151) that triggered the alert. Accordingly, the alert (e.g., beacon alert (154)) is stored as an entry in the hints table (131).

In one or more embodiments, the beacon detector (124) is further configured to verify that the source IP address of the tuple is inside the enterprise network and the destination IP address of the tuple is outside the enterprise network. In one or more embodiments, the well known IP list (130) is pre-determined and provided to the beacon detector (124). In one or more embodiments, the beacon detector (124) is further configured to determine the well known IP list (130). In one or more embodiments, the well known IP list (130) is determined based on popularity of IPs as measured by connection activities in the computer network (110). Specifically, data packets sent to/from a host in the computer network (110) are inspected to tally a measure of occurrences of the host's IP address (i.e., host IP address or host IP) in source IP address fields and destination IP address fields of these data packets. If such measure of occurrences exceeds a pre-determined host popularity threshold, the host IP address is included in the well known IP list (130). In one or more embodiments, the measure of occurrences of the host IP in the IP address fields is weighted by packet size of a data packet in which the host IP occurs.

In one or more embodiments, the botnet beacon and exfiltration detector (120) includes the rule set module (125) that is configured, in conjunction with the beacon detector (124), to adjust the pre-determined beacon flow size threshold, the pre-determined beacon timing interval range, the pre-determined beacon timing variance threshold, and the pre-determined host popularity threshold. In one or more embodiments, these thresholds and range are stored in the beacon detection profile (152) and are adjusted or calibrated, based on ground truth data sets, to reduce false positives in generating the beacon alerts (e.g., beacon alert (154)). For example, positive ground truth data sets including flow records with known beaconing event as well as negative ground truth data sets including flow records free of any beaconing event are processed by the beacon detector (124) by executing one or more rules in the beacon detection rule set (133) while the aforementioned thresholds and range are adjusted by the rule set module (125) to reduce false positives. In one or more embodiments, the beacon detector (124) includes the beacon detection profile (152) and a portion of the rule set module (125) for calibrating the beacon detection profile (152). For example, the beacon detector (124) may configure the beacon detection rule set (133) for execution based on the beacon detection profile (152). Multiple instantiations of the beacon detection rule set (133) with various thresholds adjusted differently are executed by the beacon detector (124) to process the ground truth data sets during the calibration.

In one or more embodiments, the acquisition module (123) is further configured to obtain flow records B (156) of FIG. 1 for exfiltration detection. For example, the flow records B (156) may include network traffic data sets that are collected repetitively at recurring time points. Each network traffic data set collected at a particular time point includes a set of flows each having a flow size exceeding a pre-determined exfiltration flow size threshold and includes a pair of <source IP address, destination IP address> identifying the network traffic data set.

In one or more embodiments, the botnet beacon and exfiltration detector (120) includes the exfiltration detector (126) that is configured to detect unauthorized release of data from within a computer network (e.g., an enterprise network, carrier network, etc.). In one or more embodiments, the exfiltration detector (126) is configured to analyze each of the network traffic data sets based on the exfiltration rule set (132) to generate an exfiltration detection result (e.g., exfiltration alert (159) or lack thereof) at each of the recurring time points. In one or more embodiments, the exfiltration rule set (132) uses parameters that is configured based on the exfiltration detection profile (157), which includes the aforementioned thresholds and baseline, such as exfiltration flow size threshold used for determining a large flow coming out of a host.

In one or more embodiments, the exfiltration detector (126) executes one or more rules in the exfiltration rule set (132) to compare parameters (e.g., flow size, average data transfer rate, peak data transfer rate, number of open connections, number of active protocols, number of open ports, etc.) of a network traffic data set to corresponding thresholds (e.g., exfiltration flow size threshold, average data transfer rate threshold, peak data transfer rate threshold, open connections threshold, active protocols threshold, open ports threshold, etc.) in the exfiltration detection profile (157). Specifically, the exfiltration event is detected in response to the network traffic parameters exceeding the corresponding thresholds in the comparison. Accordingly, the exfiltration alert (159) is generated. In default condition, the exfiltration detection is based on normal parameter values in the exfiltration detection profile (157). In one or more embodiments, when a match between the network traffic data set and one or more entries (e.g., hint (155)) in the hints table (131) is detected, the exfiltration detection profile (157) is elevated for detecting the exfiltration event, with the threshold and base lines switched to more stringent values.

In one or more embodiments, the botnet beacon and exfiltration detector (120) includes the rule set module (125) that is configured, in conjunction with the exfiltration detector (126), to modify, in response to detecting the match, the determined exfiltration rule set (132) to generate a modified exfiltration rule set based on the elevated exfiltration detection profile (157) with more stringent thresholds and baselines. In one or more embodiments, the modified exfiltration rule set includes an additional protocol validity check such that the exfiltration event is additionally detected in response to a result of performing the protocol validity check on the network traffic data set. Accordingly, the exfiltration event detection may be enhanced based on the modified exfiltration rule set. In one or more embodiments, the exfiltration detector (126) includes the exfiltration detection profile (157) and a portion of the rule set module (125) for detecting exfiltration activities with enhanced performance. For example, the exfiltration detector (126) may configure the exfiltration rule set (132) for execution based on the exfiltration detection profile (157). Multiple instantiations of the exfiltration rule set (132) with various thresholds adjusted differently are executed by the exfiltration detector (126) to find the best result in enhancing the exfiltration event detection.

The botnet beacon and exfiltration detector (120) may include one or more system computers, which may be implemented as a server or any conventional computing system However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

While specific components are depicted and/or described for use in the units and/or modules of the botnet beacon and exfiltration detector (120), it will be appreciated that a variety of components with various functions may be used to provide the formatting, processing, utility and coordination functions necessary to modify various working data used by the botnet beacon and exfiltration detector (120). The components may have combined functionalities and may be implemented as software, hardware, firmware, or combinations thereof.

Figure 3:
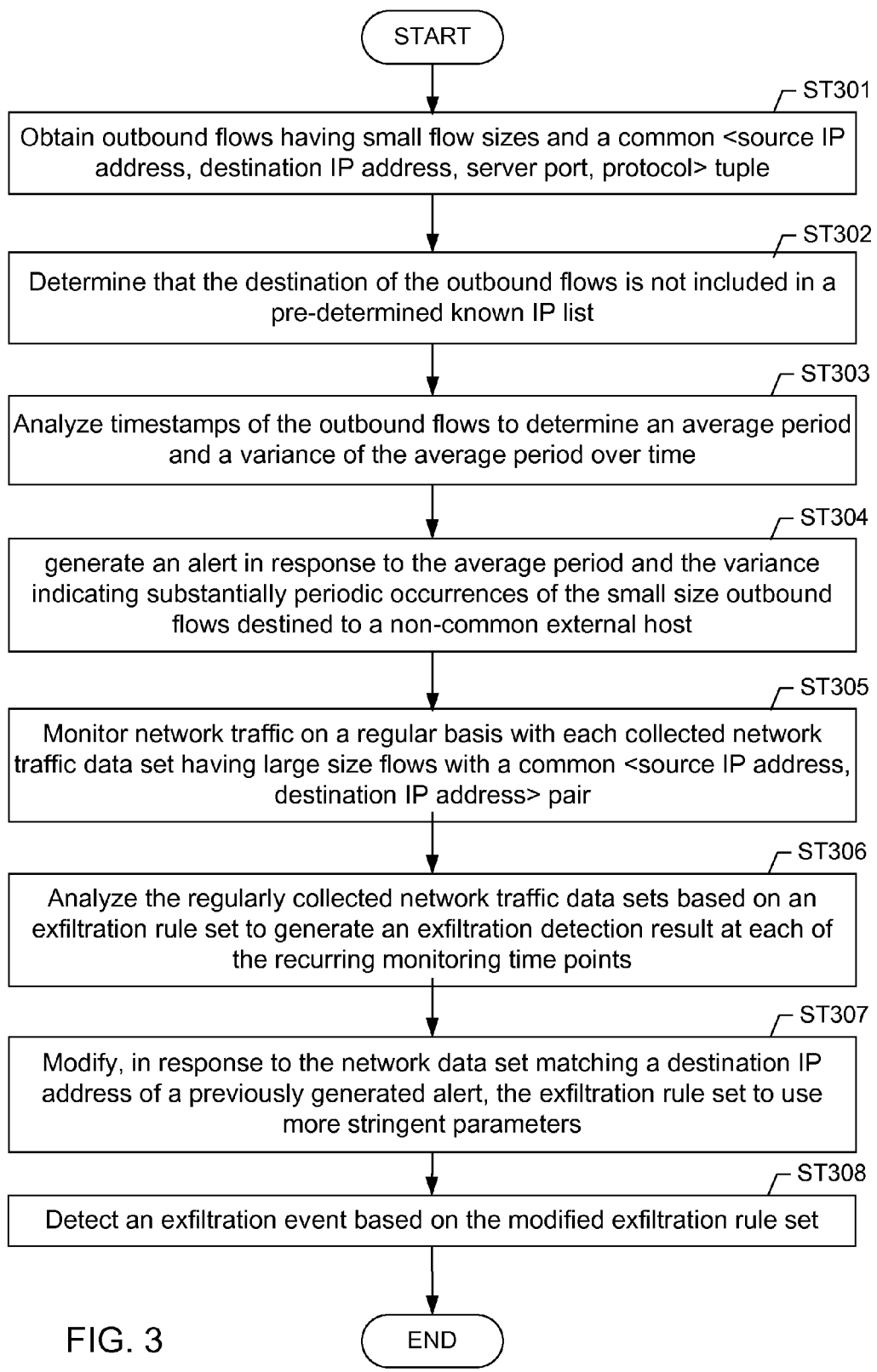
FIG. 3 shows a method flow chart according to aspects of the invention.

FIG. 3 depicts a method flowchart of methods in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangements of steps shown in FIG. 3. In one or more embodiments of the invention, the method depicted in FIG. 3 may be practiced using system (200) described with respect to FIG. 2 above.

In one or more embodiments of the invention, a network trace is obtained for analysis from a computer network (e.g., Internet). For example, the network trace may be captured by a packet analyzer, network analyze, protocol analyzer, sniffer, netflow device, semantic traffic analyzer (STA), or other types of data collection device and represents a portion of the network data in the network observable by such data collection device.

In one or more embodiments, the network trace includes flow records that are captured on a periodic basis (e.g., every minute, hourly, daily, etc.) or in response to an event (e.g., observation or elimination of botnet or spam activity). For example, certain small size flow records are captured to detect beacon (e.g., botnet beacon) events indicating potentially infected client nodes (e.g., bots) in an enterprise network communicating to external (e.g., outside of an enterprise network) hosts that may be malicious (e.g., C&C server of a botnet). In another example, certain large size flow records are captured to detect exfiltration events. When such large size flow records match the <source IP address, destination IP address> pair associated with previously detected botnet beacon(s), the extfiltration detection rule set is tightened up to use more stringent parameters (e.g., tighter thresholds and re-calculated baselines).

Initially in Step 301, outbound flows having small flow sizes and a common <source IP address, destination IP address, port, protocol> tuple are obtained (e.g., captured) for analysis. In one or more embodiments, each of the captured flows has a flow size less than a beacon flow size threshold and the same <source IP address, destination IP address, port, protocol> tuple for all flows. In particular, the outbound flows has a source IP address of a node inside an enterprise network and a destination IP address of a node outside of the enterprise network. In one or more embodiments, the flow size may be a measure of packet size, a measure of packet counts, a measure of bytes sent, or a measure of flow repeatability.

In Step 302, the destination of the outbound flows is determined to be not included in a well known IP list. In one or more embodiments, the destination IP address is compare with each IP address in the well known IP list to determine that the destination IP address is not included in the well known IP list. In one or more embodiments, the well known IP list is determined by obtaining data packets from network traffic over a period of time and tallying a measure of occurrences of host IP addresses in source IP address fields and destination IP address fields of these data packets. If such measure of occurrences for a particular host IP address exceeds a pre-determined host popularity threshold, this host IP address is included in the well known IP list. In one or more embodiments, the measure of occurrences of the host IP address in the IP address fields is weighted by packet size of a data packet in which the host IP address occurs.

In Step 303, timestamps of the outbound flows are analyzed to determine an average period and a variance of the average period over time. For example, if statistically sufficient (e.g., more than a pre-determined threshold) number of timestamps in the outbound flows exhibit a substantially periodic occurrences over time, the variance of the average period may be a small fraction of the average period. In the contrary, if timestamps in the outbound flows exhibit random occurrences over time, the variance of the average period may be much larger than the average period. Accordingly, beaconing event may be detected if the average period is determined to be within a beacon timing interval range and the variance is determined to be less than a beacon timing variance threshold.

In Step 304, an alert is generated in response to the average period and the variance indicating substantially periodic occurrences of the small size outbound flows destined to a non-common external host external to the enterprise network. In one or more embodiments, if the average period is within the beacon timing interval range and the variance is less than the beacon timing variance threshold, the small size outbound flows is determined as botnet beaconing event of a potentially infected node (i.e., the originator of the small sized outbound flows) inside the enterprise network. In particular, the non-common external host has been determined in Step 302 to be not included in the well known IP list. Accordingly, this non-common external host is potentially a malicious C&C server communicating with the potentially infected node inside the enterprise network. In one or more embodiments, the false positives (i.e., incorrectly determining a non-malicious beaconing event as a malicious botnet beacon event) are reduced/minimized by adjusting the beacon flow size threshold, the beacon timing interval range, and the beacon timing variance threshold.

In one or more embodiments, the alert is formatted to include various parameters of the outbound flows triggering the alert. The parameters may include the tuple of the flows, the average period, and the variance. In one or more embodiments, the alert is stored as an entry in a hints table to be used for configuring exfiltration detection.

Steps 305 through 308 relate to detecting unauthorized release of data from within a portion of a computer network such as an enterprise network. In particular, Steps 305 and 306 performs normal exfiltration detection while Steps 307 and 308 performs elevated exfiltration detection.

In Step 305, outbound network traffic from the enterprise network is monitored on a regular basis by obtaining (e.g., capturing) network traffic data set having large size flows with a common <source IP address, destination IP address> pair. In one or more embodiments, network traffic data sets are captured repetitively at recurring time points. Each flow in the network traffic data set has a flow size exceeding an exfiltration flow size threshold and the same particular <source Internet Protocol (IP) address, destination IP address> pair for all flows.

In Step 306, the regularly captured network traffic data sets are analyzed based on an exfiltration rule set to generate an exfiltration detection result at each of the recurring monitoring time points. Specifically, the exfiltration detection result indicates whether a particular network traffic data set is an exfiltration event or not. In one or more embodiments, the exfiltration rule set has a number of thresholds including average data transfer rate threshold, peak data transfer rate threshold, open connections threshold, active protocols threshold, and open ports threshold, etc. In one or more embodiments, the network traffic data set is analyzed by comparing parameters of the network traffic data set to corresponding thresholds in the exfiltration rule set. In one or more embodiments, an exfiltration event is detected in response to the network traffic parameters (e.g., flow size, average data transfer rate, peak data transfer rate, number of open connections, number of active protocols, number of open ports, etc.) exceeding the corresponding thresholds.

In Step 307, when a match is detected between the network traffic data set and one or more entries (i.e., previously generated beacon alerts) in the hints table, the exfiltration rule set is tightened to use more stringent parameters. In one or more embodiments, the exfiltration rule set is tightened if the destination of the network traffic data set matches any destination IP address in the hint entries. In addition, the exfiltration rule set is further tightened if both source IP address and destination of the network traffic data set match any <source IP address, destination IP address> pair in the hint entries. In one or more embodiments, the exfiltration rule set is tightened by reducing at least one threshold in the exfiltration rule set. In one or more embodiments, the exfiltration rule set is tightened by reducing all thresholds in the exfiltration rule set. In one or more embodiments, the exfiltration rule set is tightened by including an additional protocol validity check such that the exfiltration event is additionally detected in response to a result of performing the protocol validity check on the network traffic data set.

In Step 308, an exfiltration event is detected more expediently based on the modified exfiltration rule set. In one or more embodiments, reducing the thresholds in the exfiltration rule set increases detection sensitivities to change in network traffic. In particular, such change in network traffic indicates the difference between non-malicious network traffic versus the exfiltration event.

Figure 4A:
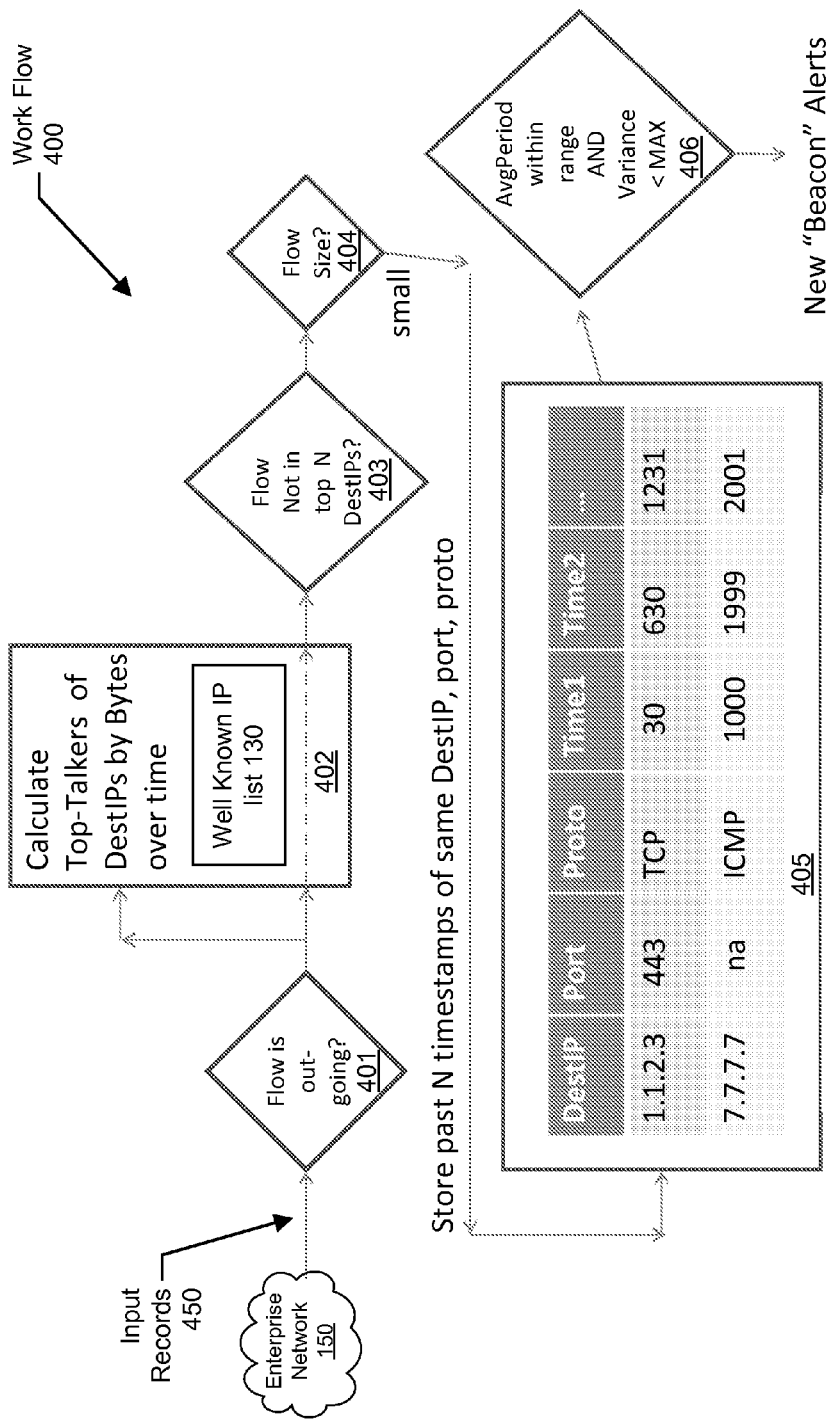
FIGS. 4A and 4B show an example according to aspects of the invention.
Figure 4B:
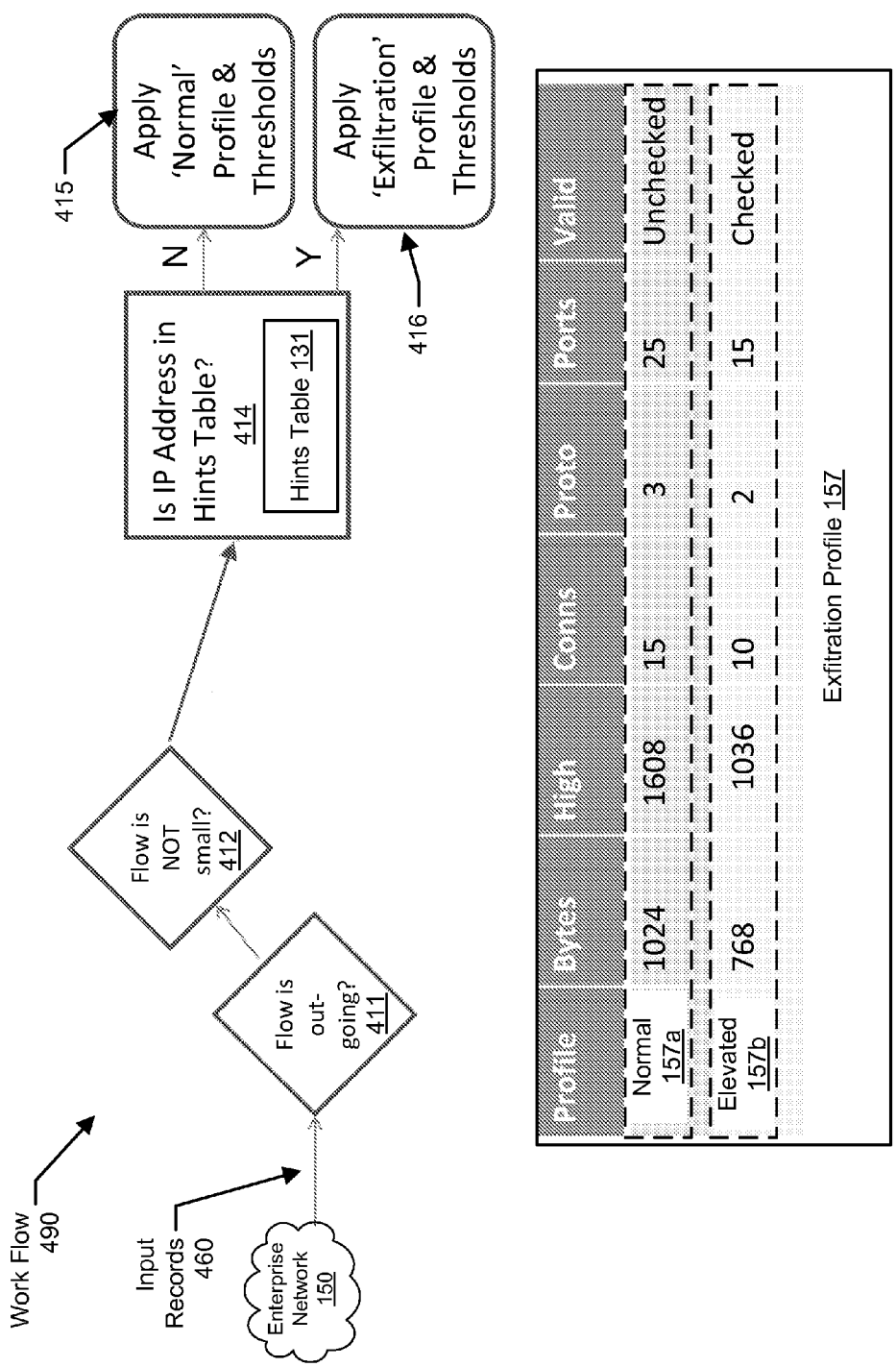

FIGS. 4A and 4B depict an example in accordance with one or more embodiments of the invention. The example is based on the system and method described in FIGS. 1 and 2 above.

FIG. 4A depicts a workflow (400) performed by the beacon detector (124) described in reference to FIG. 2 above. In the example of FIG. 4A, IP traffic flow information is used as input to the workflow. This input contains information such as a tuple of <Source IP, Source Port, Destination IP, Destination Port, IP Protocol> as well as metrics such as bytes sent and packets sent. Each unit of this input is referred to as an "input record". For example, the IP traffic flows can be captured from time to time in the enterprise network (150) described above in FIGS. 1 and 2. These captured IP traffic flows are represented as the input records (450) in the workflow (400).

The beacon detector (124) processes the input records (450) as the workflow steps below.

In workflow step 401, each input record in input records (450) is (i) received and checked for correctness of data types and data elements and (ii) checked and filtered to allow only outbound traffic exiting the enterprise network (150) to continue through the workflow (400).

In workflow step 402, external destinations of outbound traffic are tallied by counting total number of bytes over time to identify "top talkers" (i.e., IP address with a high popularity measure) that are tracked in the well known IP list (130) described above in FIG. 2. These top talkers are less likely to be malicious since they typically are top Internet destinations such as Google® (a registered trademark of Google Inc., Mountain View, Calif.), YouTube® (a registered trademark of Google Inc., Mountain View, Calif.), etc. The well known IP list (130) may also include information from other white list of known safe server/destination IPs.

In workflow step 403, the input record is filtered and allowed to continue through the workflow (400) only if the destination IP address is not included in the well known IP list (130).

In workflow step (404), the input record is filtered and allowed to continue through the workflow (400) only if the number of packets is less than a configurable threshold and the size of the packets is also less than a separate configurable threshold. The thresholds for packet count and size may be configured based on user input or automatically learned from historical traffic data. For example, if average packet size is 256 bytes with certain standard deviation, then the packet size threshold may be set as 256 bytes minus 2 standard deviations.

In workflow (405), if the input record passes all previous workflow steps, it is registered in one of many configurable length arrays based on a parameter tuple of the input record. In an example configuration, each of the configurable length arrays may register input records having the same destination IP. In another example configuration, each of the configurable length arrays may register input records having the same <Destination IP, Port> pair. In yet another example configuration, each of the configurable length arrays may register input records having the same <Destination IP, Port, Protocol> tuple. Each entry of the configurable length array may include the parameter tuple defining the array as well as timestamps of the registered input records. For example, an example array is shown in workflow step (405) to store destination IP=1.1.2.2, server server port=443, protocol=TCP, timestamp 1=30, timestamp 2=630 . . . timestamp n=1231. Another example array is shown in workflow step (405) to store destination IP=7.7.7.7, server port=na, protocol=ICMP, timestamp 1=1000, timestamp 2=1999 . . . timestamp n=2002. The arrays are used to store a configurable number ("n") of similar events (i.e., having the same tuple) over a pre-determined time period and is used to calculate the average period and variance (i.e., standard deviation) of a recurring pattern in the input records (450) to detect a potential beacon.

In workflow (406), a potential beacon is checked after "n" occurrences of similar flows that have an average period within a configurable range and have a variance or standard deviation less than a configurable threshold. Such flows are said to be beacons and output as a beacon alert. An example output beacon alert record may include a tuple of <Source IP, Destination IP, Destination Port, Protocol, beaconing-period in seconds, beaconing-variance as a percentage (e.g., variance/period), bytes sent, packets sent>.

FIG. 4B depicts a workflow (490) performed by the exfiltration detector (126) described in reference to FIG. 2 above. In the example of FIG. 4B, IP traffic flow information is used as input to the workflow. This input contains information such as a tuple of <Source IP, Source Port, Destination IP, Destination Port, IP Protocol> as well as metrics such as bytes sent and packets sent. Each unit of this input is referred to as an "input record". For example, the IP traffic flows can be captured from time to time in the enterprise network (150) described above in FIGS. 1 and 2. These captured IP traffic flows are represented as the input records (460) in the workflow (490).

The exfiltration detector (126) processes the input records (460) as the workflow steps below.

In workflow step 411, each input record in input records (450) is (i) received and checked for correctness of data types and data elements and (ii) checked and filtered to allow only outbound traffic exiting the enterprise network (150) to continue through the workflow (490).

In workflow step (412), the input record is filtered and allowed to continue through the workflow (490) only if the number of packets exceeds a configurable threshold and the size of the packets also exceeds a separate configurable threshold. The thresholds for packet count and size may be configured based on user input or automatically learned from historical traffic data. For example, if average packet size is 256 bytes with certain standard deviation, then the packet size threshold may be set as 256 bytes plus 2 standard deviations.

In workflow (414), if the input record passes all previous workflow steps, it is compared to entries in the hints table (131) described in FIGS. 1 and 2 above. If neither the source IP address nor destination IP address of the input record is tracked in the hints table (131), a normal exfiltration detection scheme (415) is used based on a normal profile (157a) in the exfiltration profile (157) described in FIG. 1 above. For example, network traffic parameters of the input record are compared to average data transfer rate threshold, peak data transfer rate threshold, open connections threshold, active protocols threshold, open ports threshold, etc. in the normal profile (157a) to generate the exfiltration alert (159) if one or more of these thresholds are exceeded.

If either the source IP address or destination IP address of the input record is tracked in one or more entries of the hints table (131), an elevated exfiltration detection scheme (416) is used based on an elevated profile (157b) in the exfiltration profile (157). Comparing to the normal exfiltration detection scheme (415), the elevated exfiltration detection scheme (416) has more aggressive threshold values and therefore has increased sensitivity to potential exfiltrated data in the input record. As shown, the data transfer rate threshold, peak data transfer rate threshold, open connections threshold, active protocols threshold, open ports threshold, etc. in the elevated profile (157b) are reduced from those in the normal profile (157a) to increase detection sensitivities. In the event that the input record does not trigger an exfiltration alert (e.g., the exfiltration alert (159)), the average data transfer rate and/or peak data transfer rate of this IP address is used as additional information to be tracked in the hints table (131) and referred to as the last known rate of the IP address. When the elevated exfiltration detection scheme (416) is used, the last known rate of the IP address is also used as a trigger event in addition to comparing network traffic parameters of the input record to reduced values of average data transfer rate threshold, peak data transfer rate threshold, open connections threshold, active protocols threshold, open ports threshold, etc. in the elevated profile (157b). For example, if the current packet/byte rate in the input record is more than a configurable percentage above the last known rate of the IP address in the input record, the exfiltration alert (159) is generated. An example of a configurable percentage is 100% (i.e., the last known rate multipler is 200% or 2x). If a flow is identified with the IP address of 1.2.3.4 tracked as an entry in the hints table (131) where the entry has a last known rate of 1000 (bytes per second or packets per second depending on configuration), the exfiltration alert (159) will be generated if the current rate of the input record is greater than 2000 (i.e., the last known rate plus 100% of the last known rate or the last known rate multiplied by the last known rate multiplier 200%).

The elevated exfiltration detection scheme may also activate exfiltrated data detection by layer 4 inspection of bits/sec, packets/sec, changes in upload/download ratio, average payload size, etc. or layer 7 inspection of packet payload regexes, changes in protocol mix, protocol detection, encryption use, etc. These additional deep packet inspections are very processor/memory intensive and cannot be performed on all records, they are only done on those input records having attributes matching one or more entries in the hints table (131). As shown in the example of FIG. 4B, the normal profile (157a) includes average data transfer rate threshold=1024 bytes, peak data transfer rate threshold=1608 bytes, open connections threshold=15, active protocols threshold=3, open ports threshold=25, and deep packet inspection set activation status as "unchecked" (i.e., deep packet inspection not activated to check validity). In addition, the elevated profile (157b) includes average data transfer rate threshold=768 bytes, peak data transfer rate threshold=1036 bytes, open connections threshold=10, active protocols threshold=2, open ports threshold=15, and deep packet inspection activation status set as "checked" (i.e., deep packet inspection activated to check validity).

Although specific formats, structures, or partitions are used as examples in the foregoing description regarding the various components in the botnet beacon and exfiltration detection tool, user system, and computer network, one skilled in the art, with the benefit of this disclosure, would recognize that other formats or structures may also be used in the system, methods, and examples described without deviating from the spirit of the invention.

Figure 5:
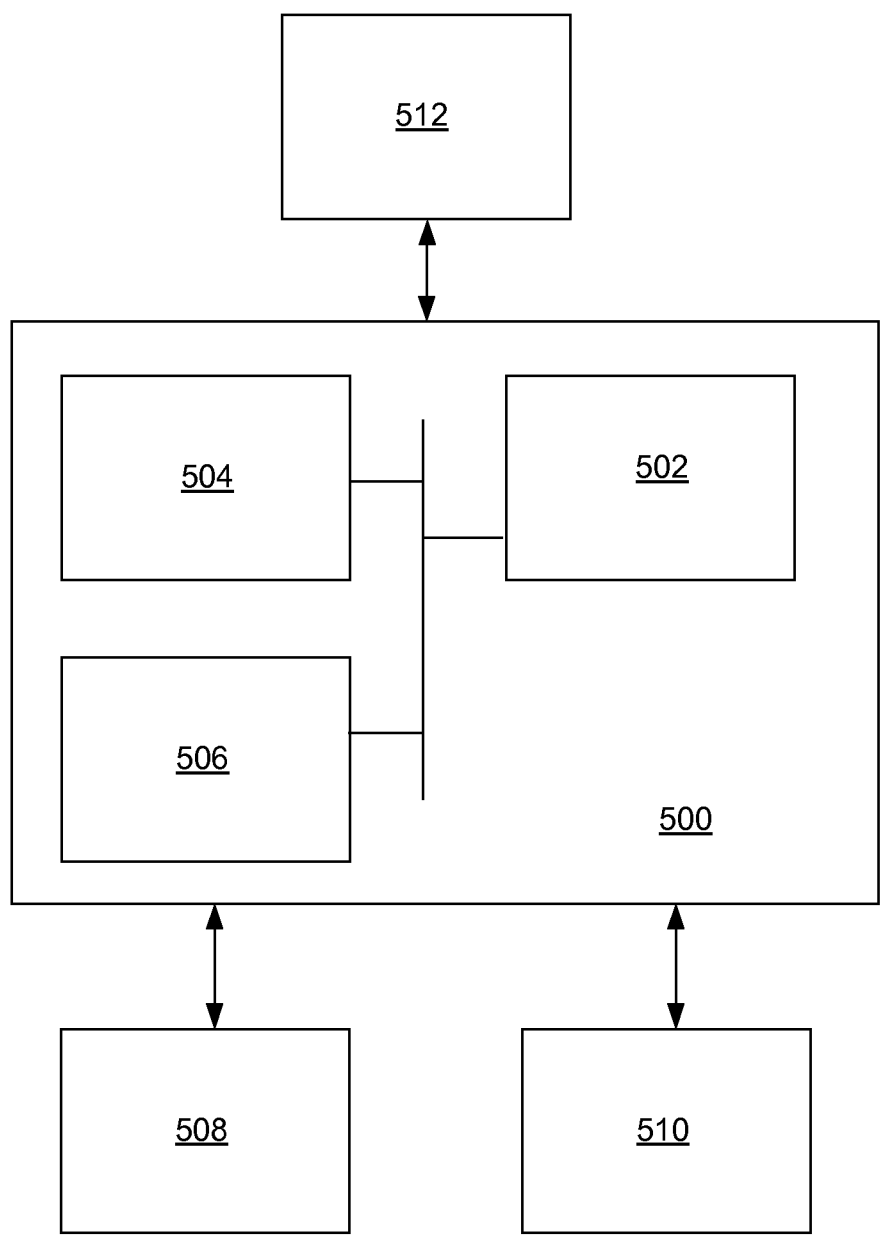
FIG. 5 shows a computer system according to aspects of the invention.

Embodiments of the invention may be implemented on virtually any type of computer regardless of the platform being used. For example, as shown in FIG. 5, a computer system (500) includes one or more processor(s) (502) (e.g., central processing unit or CPU), associated memory (504) (e.g., random document access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor) for example to display various results such as the feature vectors, the principal components, the application space, the signatures, etc. The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a botnet in a network, comprising:
    obtaining a first plurality of flows each having a flow size less than a first pre-determined threshold and comprising a tuple of <source Internet Protocol (IP) address, destination IP address, server port, protocol>;
    comparing, by a hardware processor, the destination IP address and each IP address in a pre-determined well known IP list to determine that the destination IP address is not included in the well known IP list;
    analyzing, by the hardware processor, a plurality of timestamps of the first plurality of flows to determine an average period and a variance of the average period;
    generating an alert in response to the average period being within a pre-determined range and the variance being less than a second pre-determined threshold;
    the method further comprising:
        repetitively obtaining a plurality of network traffic data sets each obtained at one of a plurality of recurring time points, wherein each network traffic data set comprises a second plurality of flows each having a flow size exceeding a third pre-determined threshold and comprising a particular <source IP address, destination IP address> pair;
        analyzing each of the plurality of network traffic data sets based on a pre-determined exfiltration rule set to generate an exfiltration detection result at each of the plurality of recurring time points, wherein the pre-determined exfiltration rule set comprises a plurality of thresholds;
        modifying, in response to at least one element of the particular <source IP address, destination IP address> pair matching the alert, the pre-determined exfiltration rule set to generate a modified exfiltration rule set by reducing at least one threshold of the plurality of thresholds; and detecting an exfiltration event based on the modified exfiltration rule set.

2. The method of claim 1, wherein the alert comprises an indication that the source IP address is associated with a potential bot of the botnet.

3. The method of claim 1, wherein the alert comprises an indication that the destination IP address is associated with a potential command and control server of the botnet.

4. The method of claim 1, wherein the flow size comprised at least one selected from a group consisting of a measure of packet size, a measure of packet counts, a measure of bytes sent, and a measure of flow repeatability.

5. The method of claim 4, wherein the alert comprises:
    the tuple and at least one selected from a group consisting of the average period, and the variance.

6. The method of claim 1, further comprising:
    determining the source IP address as inside a portion of the network; and determining the destination IP address as outside of the portion of the network.

7. The method of claim 1, further comprising determining the well known IP list by:
    obtaining a plurality of data packets from network traffic in the network based on a pre-determined criterion;
    determining a popularity measure of an IP address in the plurality of data packets; and
    including the IP address in the well known IP list in response to the popularity measure exceeding a third pre-determined threshold, wherein the popularity measure comprises a measure of occurrences of the IP address in source IP address fields and destination IP address fields of the plurality of data packets.

8. The method of claim 7, wherein the measure of occurrences of the IP address in the source IP address fields and destination IP address fields of the plurality of data packets is weighted by packet size of a data packet in which the IP address occurs.

9. The method of claim 1,
    wherein analyzing each of the plurality of network traffic data sets based on the pre-determined exfiltration rule set comprises comparing the at least one threshold to a corresponding parameter of a network traffic data set,
    wherein the corresponding parameter comprises at least one selected from a group consisting of an average data transfer rate, a peak data transfer rate, a number of open connections, a number of protocols, and a number of ports, and
    wherein the exfiltration event is detected in response to the corresponding parameter exceeding the at least one threshold.

10. The method of claim 9,
    wherein modifying the pre-determined exfiltration rule set to generate the modified exfiltration rule set comprises adding protocol validity check to the pre-determined exfiltration rule set, and
    wherein the exfiltration event is detected further in response to a result of performing the protocol validity check of the network traffic data set.

11. A system for identifying a botnet in a network, comprising:
    a hardware processor;
    an acquisition module executing on the hardware processor and configured to:

obtain a first plurality of flows each having a flow size less than a first pre-determined threshold and comprising a tuple of <source Internet Protocol (IP) address, destination IP address, server port, protocol>;

wherein the acquisition module further configured to:
repetitively obtain a plurality of network traffic data sets each obtained at one of a plurality of recurring time points, wherein each network traffic data set comprises a second plurality of flows each having a flow size exceeding a third pre-determined threshold and comprising a particular pair;

the system further comprising an exfiltration detector, executing on the hardware processor, coupled to the beacon detector, and configured to: analyze each of the plurality of network traffic data sets based on a pre-determined exfiltration rule set to generate an exfiltration detection result at each of the plurality of recurring time points, wherein the pre-determined exfiltration rule set comprises a plurality of thresholds;

modify, in response to at least one element of the particular <source IP address, destination IP address> pair matching the alert, the pre-determined exfiltration rule set to generate a modified exfiltration rule set by reducing at least one threshold of the plurality of thresholds; and detect an exfiltration event based on the modified exfiltration rule set;

a beacon detector coupled to the acquisition module, executing on the hardware processor, and configured to:
compare the destination IP address and each IP address in a well known IP list to determine that the destination IP address is not included in the well known IP list;

analyze a plurality of timestamps of the first plurality of flows to determine an average period and a variance of the average period; and generate an alert in response to the average period being within a pre-determined range and the variance being less than a second pre-determined threshold.

12. The system of claim 11, wherein the alert comprises an indication that the source IP address is associated with a potential bot of the botnet.

13. The system of claim 11, wherein the alert comprises an indication that the destination IP address is associated with a potential command and control server of the botnet.

14. The system of claim 11, wherein the flow size comprised at least one selected from a group consisting of a measure of packet size, a measure of packet counts, a measure of bytes sent, and a measure of flow repeatability.

15. The system of claim 14, wherein the alert comprises:
the tuple and at least one selected from a group consisting of the average period, and the variance.

16. The system of claim 11, the beacon detector further configured to:
determine the source IP address as inside a portion of the network; and
determine the destination IP address as outside of the portion of the network.

17. The system of claim 11, the beacon detector further configured to determine the well known IP list by:
obtaining a plurality of data packets from network traffic in the network based on a pre-determined criterion;
determining a popularity measure of an IP address in the plurality of data packets; and
including the IP address in the well known IP list in response to the popularity measure exceeding a third pre-determined threshold, wherein the popularity measure comprises a measure of occurrences of the IP address in source IP address fields and destination IP address fields of the plurality of data packets.

18. The system of claim 17, wherein the measure of occurrences of the IP address in the source IP address fields and destination IP address fields of the plurality of data packets is weighted by packet size of a data packet in which the IP address occurs.

19. The system of claim 11,
wherein analyzing each of the plurality of network traffic data sets based on the pre-determined exfiltration rule set comprises comparing the at least one threshold to a corresponding parameter of a network traffic data set,
wherein the corresponding parameter comprises at least one selected from a group consisting of an average data transfer rate, a peak data transfer rate, a number of open connections, a number of protocols, and a number of ports, and
wherein the exfiltration event is detected in response to the corresponding parameter exceeding the at least one threshold.

20. The system of claim 19,
wherein modifying the pre-determined exfiltration rule set to generate the modified exfiltration rule set comprises adding protocol validity check to the pre-determined exfiltration rule set, and
wherein the exfiltration event is detected further in response to a result of performing the protocol validity check of the network traffic data set.

21. A non-transitory computer readable medium storing instructions for identifying a botnet in a network, the instructions, when executed by a processor of a computer, comprising functionality for:
obtaining a first plurality of flows each having a flow size less than a first pre-determined threshold and comprising a tuple of <Internet Protocol (IP) address, destination IP address, server port, protocol>;
comparing the destination IP address and each IP address in a well known IP list to determine that the destination IP address is not included in the well known IP list;
analyzing a plurality of timestamps of the first plurality of flows to determine an average period and a variance of the average period;
generating an alert in response to the average period being within a pre-determined range and the variance being less than a second pre-determined threshold;
the instructions, when executed, further comprising functionality for:
repetitively obtaining a plurality of network traffic data sets each obtained at one of a plurality of recurring time points, wherein each network traffic data set comprises a second plurality of flows each having a flow size exceeding a third pre-determined threshold and comprising a particular <source IP address, destination IP address> pair;
analyzing each of the plurality of network traffic data sets based on a pre-determined exfiltration rule set to generate an exfiltration detection result at each of the plurality of recurring time points, wherein the pre-determined exfiltration rule set comprises a plurality of thresholds;
modifying, in response to at least one element of the particular <source IP address, destination IP address> pair matching the alert, the pre-determined exfiltration rule set to generate a modified exfiltration rule set by reducing at least one threshold of the plurality of thresholds; and detecting an exfiltration event based on the modified exfiltration rule set.

22. The non-transitory computer readable medium of claim 21, wherein the alert comprises an indication that the source IP address is associated with a potential bot of the botnet.

23. The non-transitory computer readable medium of claim 21, wherein the alert comprises an indication that the destination IP address is associated with a potential command and control server of the botnet.

24. The non-transitory computer readable medium of claim 21, wherein the flow size comprised at least one selected from a group consisting of a measure of packet size, a measure of packet counts, a measure of bytes sent, and a measure of flow repeatability.

25. The non-transitory computer readable medium of claim 24, wherein the alert comprises:
the tuple and at least one selected from a group consisting of the average period, and the variance.

26. The non-transitory computer readable medium of claim 21, the instructions, when executed, further comprising functionality for:
determining the source IP address as inside a portion of the network; and determining the destination IP address as outside of the portion of the network.

27. The non-transitory computer readable medium of claim 21, the instructions, when executed, further comprising functionality for determining the well known IP list by:
obtaining a plurality of data packets from network traffic in the network based on a pre-determined criterion;
determining a popularity measure of an IP address in the plurality of data packets; and
including the IP address in the well known IP list in response to the popularity measure exceeding a third pre-determined threshold, wherein the popularity measure comprises a measure of occurrences of the IP address in source IP address fields and destination IP address fields of the plurality of data packets.

28. The non-transitory computer readable medium of claim 27, wherein the measure of occurrences of the IP address in the source IP address fields and destination IP address fields of the plurality of data packets is weighted by packet size of a data packet in which the IP address occurs.

29. The non-transitory computer readable medium of claim 21,
wherein analyzing each of the plurality of network traffic data sets based on the pre-determined exfiltration rule set comprises comparing the at least one threshold to a corresponding parameter of a network traffic data set,
wherein the corresponding parameter comprises at least one selected from a group consisting of an average data transfer rate, a peak data transfer rate, a number of open connections, a number of protocols, and a number of ports, and
wherein the exfiltration event is detected in response to the corresponding parameter exceeding the at least one threshold.

30. The non-transitory computer readable medium of claim 29,
wherein modifying the pre-determined exfiltration rule set to generate the modified exfiltration rule set comprises adding protocol validity check to the pre-determined exfiltration rule set, and
wherein the exfiltration event is detected further in response to a result of performing the protocol validity check of the network traffic data set.

* * * * *